United States Patent
Mueller et al.

(10) Patent No.: US 10,001,295 B2
(45) Date of Patent: Jun. 19, 2018

(54) BLOW THROUGH DIRECT FIRED HEATING, A/C AND ERV

(71) Applicant: CAMBRIDGE ENGINEERING, INC., Chesterfield, MO (US)

(72) Inventors: Michael Rodney Mueller, Wildwood, MO (US); Carl Merrill Schoeneberg, Chesterfield, MO (US); John Patrick Foley, Jr., Manchester, MO (US); Thomas Joseph Cleary, Kirkwood, MO (US); Marc David Braun, Webster Groves, MO (US)

(73) Assignee: Cambridge Enginnering, Inc., Chesterfield, MO (US)

( * ) Notice: Subject to any disclaimer, the term of this patent is extended or adjusted under 35 U.S.C. 154(b) by 831 days.

(21) Appl. No.: 14/305,226

(22) Filed: Jun. 16, 2014

(65) Prior Publication Data
US 2015/0362213 A1  Dec. 17, 2015

(51) Int. Cl.
| F23D 5/14 | (2006.01) |
| F23N 1/02 | (2006.01) |
| F24C 5/16 | (2006.01) |
| F24H 3/04 | (2006.01) |
| F24H 9/20 | (2006.01) |
| F24H 9/00 | (2006.01) |
| F24D 5/02 | (2006.01) |

(52) U.S. Cl.
CPC .............. *F24H 3/0488* (2013.01); *F24D 5/02* (2013.01); *F24H 9/0063* (2013.01); *F24H 9/0068* (2013.01); *F24H 9/2085* (2013.01); *F24D 2200/04* (2013.01); *F24F 2221/34* (2013.01); *F24F 2221/54* (2013.01); *F24F 2221/56* (2013.01)

(58) Field of Classification Search
CPC .... F24H 3/0488; F24H 9/0063; F24H 9/0068; F24H 9/2085; F24D 5/02; F24D 2200/04; F24F 2221/54; F24F 2221/56; F24F 2221/34
See application file for complete search history.

(56) References Cited

U.S. PATENT DOCUMENTS

| 4,557,249 | A | * | 12/1985 | Sweedyk | F24H 3/087 |
| | | | | | 126/110 AA |
| 4,716,957 | A | * | 1/1988 | Thompson | F24F 3/001 |
| | | | | | 165/11.1 |
| 4,862,698 | A | | 9/1989 | Morgan et al. | |
| 4,917,074 | A | * | 4/1990 | Brekke | F24H 3/0488 |
| | | | | | 126/110 A |
| 5,802,862 | A | | 9/1998 | Eiermann | |
| 6,698,219 | B2 | | 3/2004 | Sekhar et al. | |
| 6,751,964 | B2 | | 6/2004 | Fischer | |
| 7,441,412 | B2 | | 10/2008 | Jensen | |
| 8,147,302 | B2 | | 4/2012 | Desrochers et al. | |
| 8,603,218 | B2 | | 12/2013 | Montie et al. | |
| 2004/0211553 | A1 | * | 10/2004 | Hancock | F24F 1/0007 |
| | | | | | 165/260 |
| 2005/0076903 | A1 | * | 4/2005 | Briere | F24B 1/1808 |
| | | | | | 126/503 |

(Continued)

*Primary Examiner* — Larry Furdge
(74) *Attorney, Agent, or Firm* — Harness, Dickey & Pierce, P.L.C.

(57) ABSTRACT

According to various aspects, exemplary embodiments are disclosed of blow through direct fired heaters including evaporator coils and/or energy recovery ventilation.

17 Claims, 9 Drawing Sheets

(56) References Cited

U.S. PATENT DOCUMENTS

| | | |
|---|---|---|
| 2009/0188985 A1 | 7/2009 | Scharing et al. |
| 2011/0067421 A1 | 3/2011 | Shiraishi et al. |
| 2012/0216558 A1 | 8/2012 | Dempsey et al. |
| 2013/0180700 A1 | 7/2013 | Aycock |
| 2014/0106660 A1 | 4/2014 | Salerno |

* cited by examiner

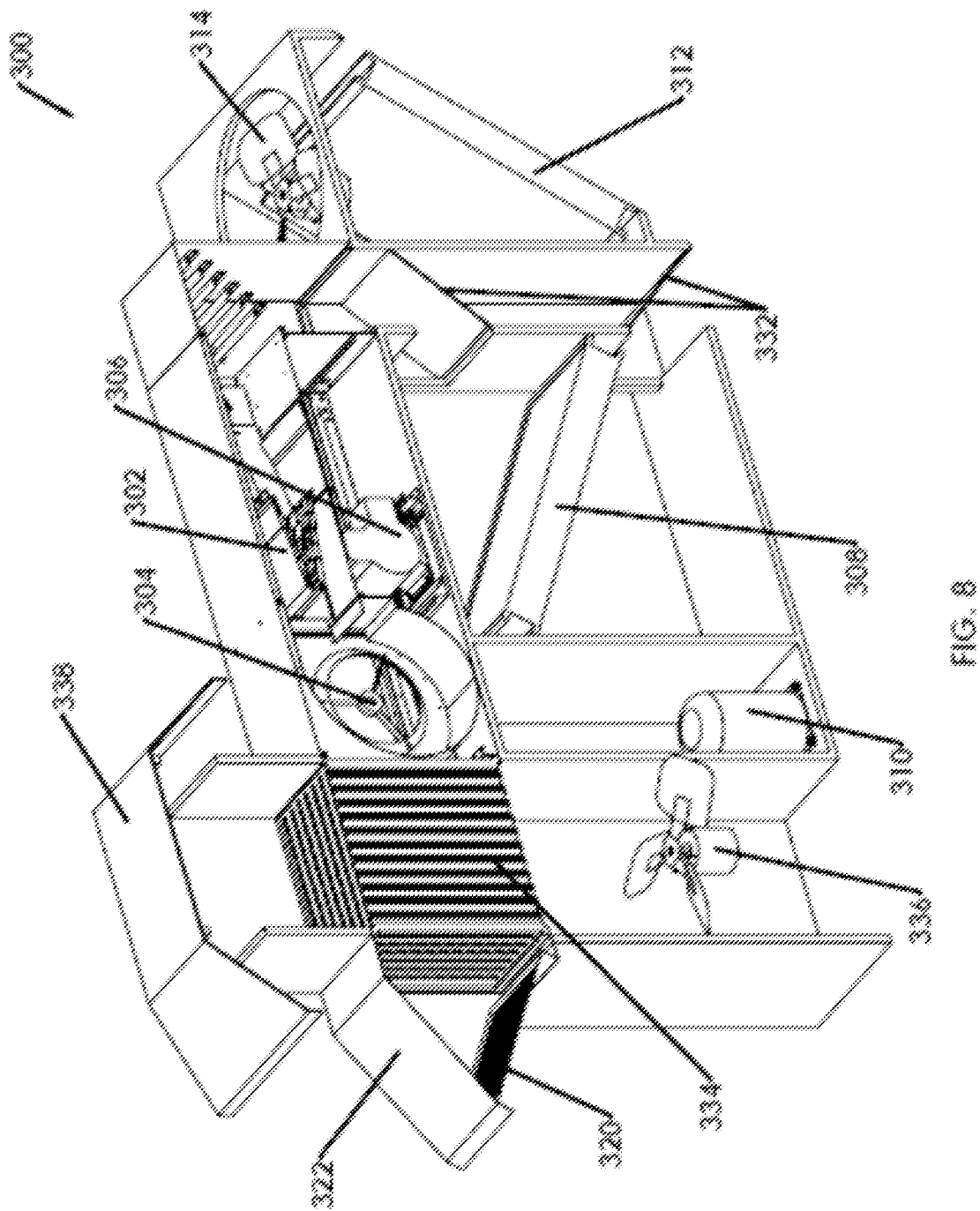

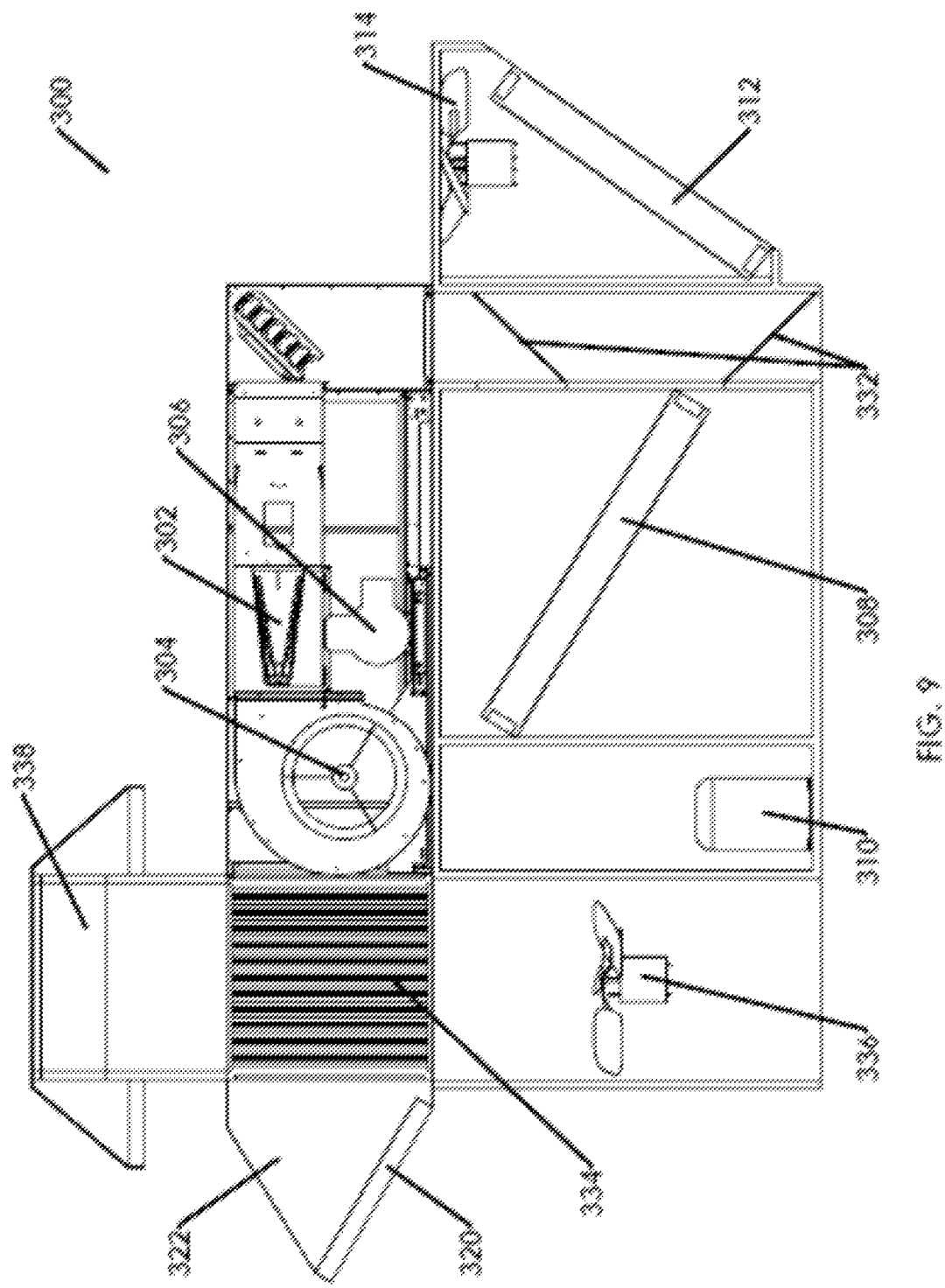

BLOW THROUGH DIRECT FIRED HEATING, A/C AND ERV

FIELD

The present disclosure generally relates to blow through direct fired heaters, which may include air conditioning and/or energy recovery ventilation.

BACKGROUND

This section provides background information related to the present disclosure which is not necessarily prior art.

Direct gas-fired heaters have been manufactured for over 50 years to serve industrial and commercial facilities. In direct fired commercial heaters, circulation air and products of combustion are vented directly into the space being heated, unlike indirect fired heaters that vent combustion products to the outdoors. Direct gas-fired heaters are primarily intended for space heating applications in commercial and industrial facilities to address the heat load and ventilation requirements of these facilities.

Direct gas-fired heaters have also been marketed for over 50 years with a blow-through heater configuration in which the blower is upstream of the burner. More specifically, the blower is located to handle outside air and blow the outside air past a burner, which is operable for heating the outside air before it is discharged into the space to be heated.

Direct fired blow-through heater configurations are well suited for use as space heaters. In this case, a direct blow-through heater may be applied to address the heat load of a facility and not to match a given exhaust application. Industrial and commercial buildings have an infiltration load element as part of its heat load as a result of wind and temperature differences between indoor and outdoor temperatures. Based on ASHRAE (American Society of Heating, Refrigeration, and Air-Conditioning Engineers) ventilation requirements, it is often necessary to provide a source for this ventilation requirement as well as which can be met by this same heater.

In some well insulated buildings, the infiltration element of the heat load analysis can show that the infiltration load and the load associated with the ventilation requirement are more significant than the conduction load. In these applications, the optimization of a heating system occurs when the system first addresses and matches the combination of infiltration load and ventilation load on a designated day and then checks to verify that the conduction load requirement has also been addressed. When a direct fired heater is utilized for space heating, that portion of the heater's capacity that heats the outside air temperature to room temperature is directly tied to the infiltration and ventilation heat load. That portion of the heater capacity above room temperature and the maximum temperature rise of the heater are applied to the conduction load with any extra capacity also being applied to any infiltration and ventilation heat load remaining, if required. There is a significant system efficiency advantage if the blow-through heater is capable of obtaining a temperature rise equal to the maximum discharge temperature allowed by the ANSI (American National Standards Institute) Standard Z83.4 for Non-Recirculating Direct Gas-Fired Industrial Air Heaters. ANSI Standard Z83.4 sets the maximum discharge temperature at 160° F. and limits the maximum temperature rise to 190° F. In an application where the minimum design for a location is 0° F. (e.g., like Saint Louis, Mo., etc.), a heater with a temperature rise of 160° F. would therefore optimize the heater selection for that location.

Another benefit of a direct fired blow-through space heater configuration is that a space heater is generally cycled on and off based on a call for heat by a room thermostat. A conventional draw-through make-up air heater will run continuously as long as the exhaust fan is operating. During the operating time of a space heater, the heater airflow tends to neutralize the flow of infiltration air into the building as a result of the air brought in by the heater escaping out of the same cracks. This exhale of the air supplied by the heater carries out other contaminants that may be created in the building. If the infiltration rate of the building is too low, additional relief openings may be required to meet the minimum ventilation requirements of the facility.

Air conditioning may be used to alter the properties of air to more favorable conditions, typically with the aim of distributing the conditioned air to an occupied space to improve comfort. Commonly, air conditioning lowers the air temperature through cooling, although other conditioning effects may also be implemented. The cooling is typically done using a refrigeration cycle (sometimes including direct expansion coiling), but other suitable technologies may also be used.

Energy recovery ventilation is the energy recovery process of exchanging energy contained in normally exhausted building or air space air and using it to treat (precondition) the incoming outdoor ventilation air in residential and commercial heating, ventilation and air conditioning (HVAC) systems. During the warmer seasons the system pre-cools and dehumidifies, and during the cooler seasons the system pre-heats and humidifies.

The inventors have recognized that a combination of blow through direct fired heating systems, direct expansion cooling, and energy recovery ventilation may allow for increased energy efficiency, as well as improving indoor air quality. The inventors have also recognized that combining the evaporator coil of an air conditioning system with the air flow of a direct fired system can lead to formation of harmful products of combustion (e.g., phosgene gas) due to the possible combustion of refrigerants as they pass the flame of a direct fired system.

SUMMARY

This section provides a general summary of the disclosure, and is not a comprehensive disclosure of its full scope or all of its features.

According to various aspects, exemplary embodiments are disclosed of blow through direct fired heaters including evaporator coils and/or energy recovery ventilation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure FIG. 1 is a perspective view of a blow through direct fired HVAC system with an evaporator coil upstream of the burner according to exemplary embodiments;

FIG. 8 is another perspective view of the blow through direct fired HVAC system shown in FIG. 7; and FIG. 9 is a side view of the blow through direct fired HVAC system shown in FIG. 7.

DETAILED DESCRIPTION

Figure 1:
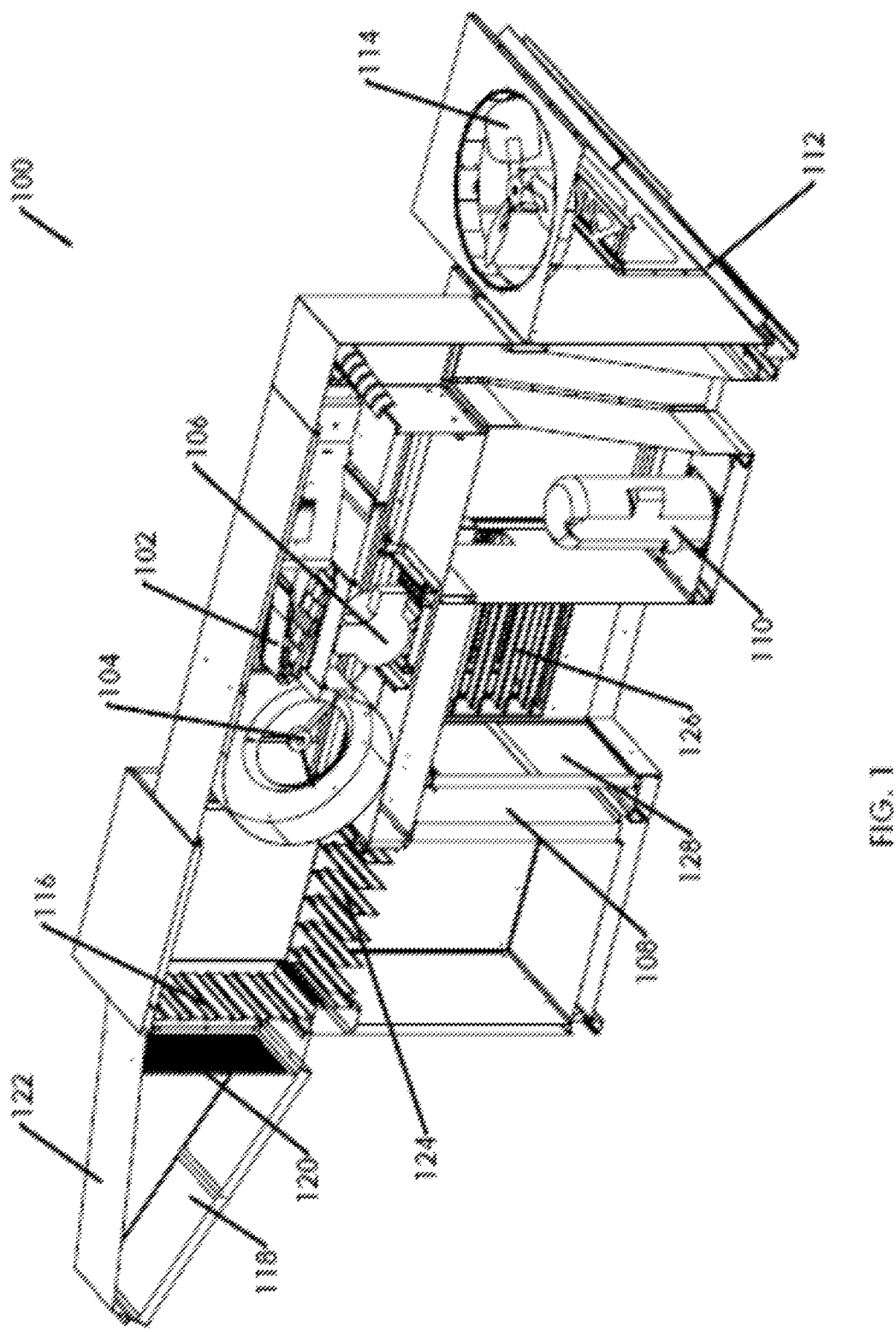

Example embodiments will now be described more fully with reference to the accompanying drawings.

The inventors have recognized that combining a blow through direct fired heating system with direct expansion coiling can provide energy efficiency as well as improving indoor air quality, but that combining the evaporator coil of an air conditioning system with the air flow of a direct fired system can lead to formation of harmful products of combustion (e.g., phosgene gas) due to the possible combustion of refrigerants as they pass the flame of a direct fired system.

By way of example, an exemplary embodiment of a direct fired heating system having direct expansion cooling with an evaporator coil upstream of a burner generally includes an air switching box and a safety circuit. When the system is in a cooling and/or air conditioning (A/C) mode, air is either returned from the indoor space, brought in from the outside, or a combination of the two. The safety circuit and air switching box ensure that the burner is off prior to any air being circulated across the coil and distributed into the environment.

When the system is in a heating mode, air is supplied directly from outdoors. The safety circuit ensures that when the burner is on, the outdoor supply of air is directed so as to not pass through the evaporator coil prior to entering the burner. This ensures any potential leak of refrigerant cannot pass through an open flame.

In another exemplary embodiment, a blow through direct fired heating system having direct expansion cooling with an evaporator coil downstream of a burner generally includes an air switching box and a safety circuit. Because the coil is oriented downstream of the burner's flame, no generation of harmful phosgene gas will occur. The air switching box and safety circuit will only divert air across the evaporator coil when in cooling or A/C mode. The air switching box will divert air so as to not pass through the coil when the system is in heating mode.

Diverting air around the evaporator coil during heating mode is important because exposure of high temperatures (e.g., 160 degree Fahrenheit air) across an evaporator coil would generate excessive pressures in the coil. This could cause unsafe working conditions, or require installation of an extremely robust coil that would not be economical to produce.

Adding one or more air conditioning components (e.g., an evaporator coil, compressor, expansion valve, condensing coil, condensing fans, A/C control, etc.) to a blow through direct fired gas heating system may allow for efficient gas heating and cooling in a compact, lightweight, easy to install, packaged HVAC system.

Due to the high static capability and high discharge velocity of such a system, it may be used in a number of different applications. For example, it can be installed in large open areas with the use of high velocity discharge elbows to mitigate stratification. Alternatively, it can be used in small separated areas with the addition of discharge ductwork to supply comfort ventilation to residential and commercial buildings. The combination of these technologies (i.e., blow through direct fired heating combined with air conditioning) in one package may significantly reduce the overall installation cost, as compared to installing separate heating and cooling systems.

Outdoor air is sometimes used in HVAC systems to improve indoor air quality. Building codes across the United States and other countries are starting to adopt and mandate indoor air quality standards. According to another exemplary embodiment, the combination of blow through direct fired technology, variable outside air A/C systems, and energy recovery ventilation (ERV) can further increase both the efficiency and indoor air quality of an HVAC system. Due to the nature of improving indoor air quality with the use of direct fired air and an outdoor air supply of an A/C system, a building may slightly pressurize, requiring conditioned air to be pushed out of a building. The combination of an ERV with the HVAC system can recover approximately 50-70% of the energy lost and reintroduce it to the incoming air stream.

The HVAC system may be optimized using air quality control. According to some example aspects of the present disclosure, monitoring of carbon dioxide ($CO_2$), humidity and/or temperature (e.g., indoor, outdoor, dry bulb, etc.) may be correlated to an optimal air flow, gas modulation and/or outside versus inside air percentage combination to increase the efficiency and quality of the air combination.

When packaging a system with blow through direct fired heating technology with A/C and/or ERV technology, each system may operate most effectively under different amounts of air flow. In order to optimize the combined systems using one source of air, variable air delivery system logic is combined with a variable mixing of inside to outside supplied air according to another example aspect of the present disclosure.

According to this example aspect, the supply of air will be delivered at different flow rates and/or combinations of inside to outside air percentages based on one or more system parameters, including without limitation, inside temperature, outside temperature, dry bulb temperature, wet bulb temperature, indoor air quality requirements ascertained by $CO_2$ detection, etc. The system may include a variable frequency drive (VFD) for adjusting the fan speed of a blower, variable dampers for adjusting the mixture of outside and inside air, and a controller for controlling the VFD and variable dampers based on the one or more sensed system parameters.

Figure 2:
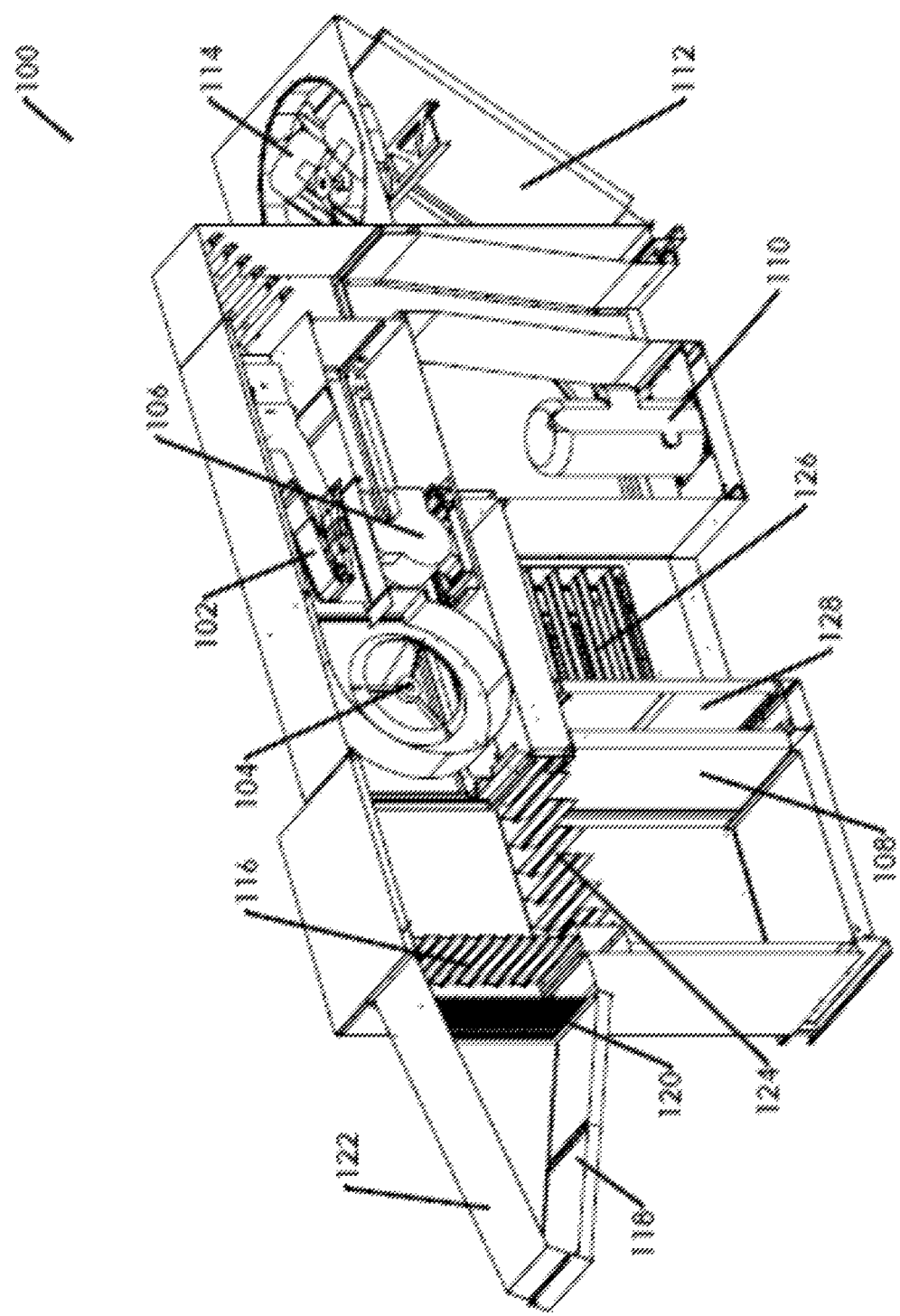
FIG. 2 is another perspective view of the blow through direct fired HVAC system shown in FIG. 1.
Figure 3:
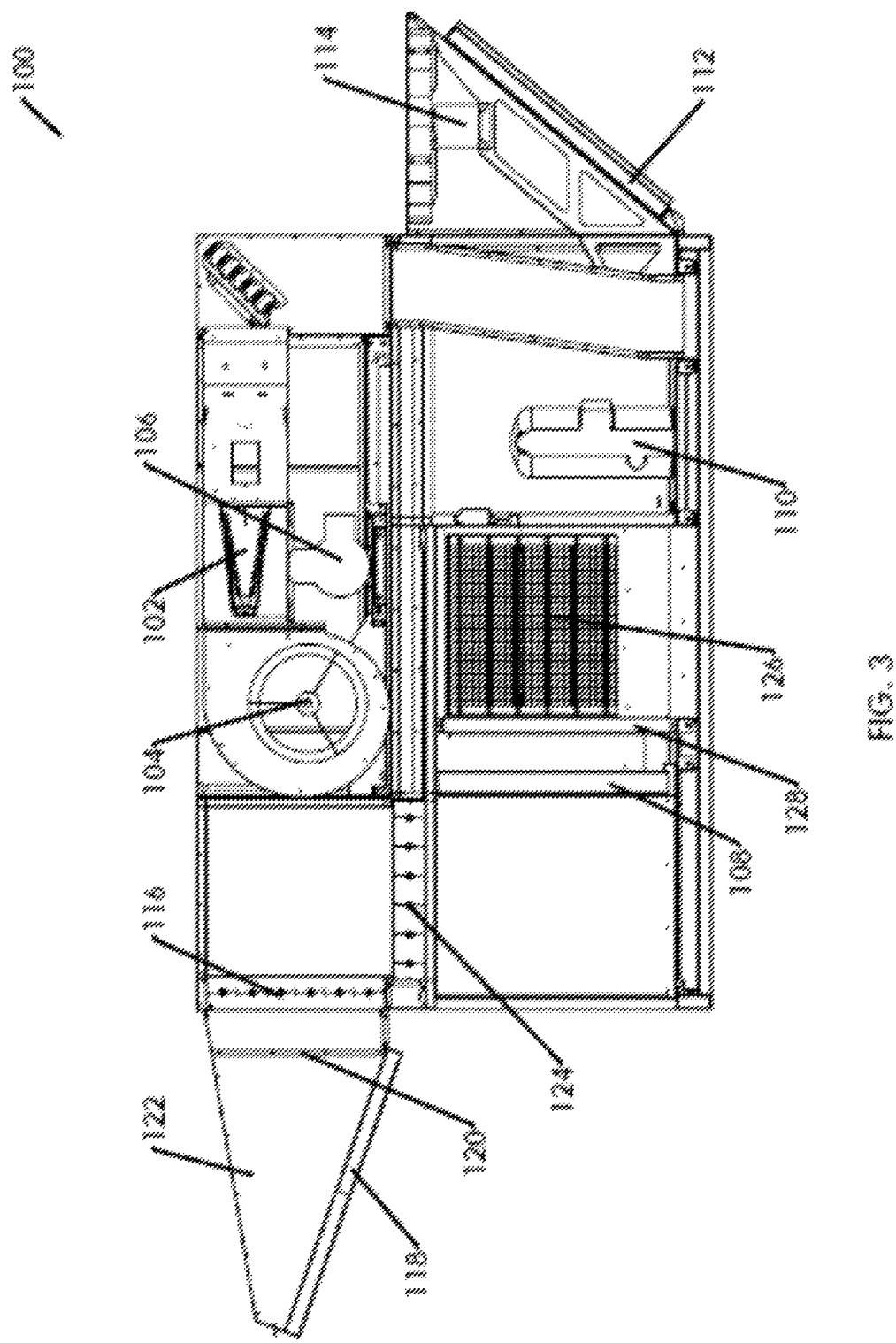
FIG. 3 is a side view of the blow through direct fired HVAC system shown in FIG. 1.

With reference now to the figures, FIGS. 1 through 3 illustrate an exemplary embodiment of a blow through direct fired HVAC system 100 embodying one or more of the various aspects and features disclosed herein. As shown in FIGS. 1-3, a burner 102 is configured to heat air circulated across an open flame of the burner 102. The burner 102 may be any suitable burner, such as, for example, a gas burner supplied by a utility gas line with a gas that is ignited to create an open flame at the burner 102. Although only a single burner 102 is illustrated in FIGS. 1-3, other embodiments may include more than one burner 102.

A blower 104 (e.g., a supply air blower) is disposed upstream of the burner 102 and configured to circulate air across the open flame of the burner 102. Accordingly, the system 100 in this example has a direct fired blow through heater configuration when operating in a heating mode. The blower 104 is driven by motor 106. The blower 104 may be any suitable blower, such as, for example, a primary circulating air blower, and may include one or more fans. Although only a single blower 104 and single motor 106 are illustrated in FIGS. 1-3, other embodiments may include more than one blower 104 and/or more than one motor 106.

The system 100 may also be configured to operate in an air conditioning mode. An evaporator coil 108 is disposed upstream of burner 102. The evaporator coil 108 may be any suitable type of evaporator coil, such as, for example, an evaporator coil configured to cool air through direct expansion. Although only one evaporator coil 108 is illustrated in FIGS. 1-3, other embodiments may include more than one evaporator coil 108.

Other components in the system 100 operable during an air conditioning mode include compressor 110, condensing coil 112, condensing coil fan 114, an expansion valve (not shown), and a controller (not shown). The compressor 110 is configured to pressurize a refrigerant. The condensing coil 112 is disposed outside for contact with outside air. The condensing coil 112 is coupled to the compressor 110 and configured to receive the pressurized refrigerant from the compressor 110 and convert the refrigerant from a gas to a liquid. The condensing coil fan 114 is configured to circulate air across the condensing coil 112. An expansion valve is coupled to the condensing coil 112 and configured to remove pressure from the refrigerant before providing the refrigerant to the evaporator coil 108. A controller is coupled to one or more of the evaporator coil 108, the compressor 110, the condensing coil 112, the condensing coil fan 114, and the expansion valve. The controller is configured to operate system 100 in a cooling and/or air conditioning mode. Although one example configuration for providing cooling and/or air conditioning is illustrated in FIGS. 1-3, any other suitable cooling configurations could be used instead, including more, less, or different air conditioning components without departing from the scope of the present disclosure.

The system 100 also includes components for allowing air to enter and circulate through the system 100. A first inlet includes a first damper 116 configured to allow outside air to enter the system 100 when opened. The outside air passes through filter 118 and inlet screen 120, which are coupled to rain hood 122. Rain hood 122 prevents rain water from entering the system 100, while filter 118 and inlet screen 120 prevent unwanted particles in the outside air from entering the system 100.

A second inlet includes a second damper 124 and a third damper 126. When the third damper 126 is open, outside air may enter the system 100, and pass through filter 128 and evaporator coil 108, thereby cooling the air. The second damper 124 allows the air to pass through to the blower 104 when open. The second damper 124 may also allow recirculated inside air to pass through the damper 124 when open, and therefore may combine previously cooled inside air with outside air received from third damper 126 and cooled by evaporator coil 108. Although the system is illustrated with a rain hood 122, filters 118 and 128, and inlet screen 120, other embodiments may include more, less, or different components for filtering and/or screening unwanted particles and/or water from entering the system 100.

The three dampers 116, 124, and 126 may be considered as an air mixing section, or an air switching box, of the system 100. When the system 100 is operating in a heating mode, the first damper 116 is opened and the second and third dampers 124, 126 are closed. This allows 100% outside air to pass through the blower 104 and burner 102 of the direct fired blow through heating configuration. This prevents or inhibits recirculation of internal air, which is a requirement of ANSI Z83.4 for safe operation of direct fired systems.

There may be micro switches on each damper 116, 124, and 126. A safety circuit and a flame safety relay may ensure that the first damper 116 is open and the second and third dampers 124, 126 are closed prior to the flame safety relay allowing the burner 102 to begin an ignition cycle. The dampers and safety circuit ensure that no air will pass over the evaporator coil 108 during heating operation, thereby preventing or inhibiting formation of harmful products of combustion (e.g., phosgene gas) due to the possible combustion of refrigerants as they pass the flame of a direct fired system.

When the system is operating in a cooling mode, the first damper 116 is closed, while the second and third dampers 124, 126 are opened. The third damper 126 allows outside air to enter the cabinet. The second damper 124 allows mixed recirculated indoor air and outside air from damper 126 to enter the upper portion of the cabinet of system 100. When the second and third dampers 124, 126 are fully opened, they provide a 50%/50% split of outside and recirculated inside air to flow through the evaporator coil 108. This provides outside fresh air to a building to meet ventilation requirements and recirculated indoor air to be more economical, because cooling 100% outside air requires significantly more energy.

The safety circuit ensures that the first damper 116 is closed and that the second and third dampers 124, 126 are opened prior to the air conditioning compressor 110 and the fan motor 106 being turned on. The safety circuit will also ensure the flame safety relay will not energize the burner combustion system. This ensures that in the event of an evaporator coil refrigerant leak, no refrigerant will pass over the open flame of the burner causing harmful products of combustion.

The system 100 may operate in a mode of 100% outside air for heating, and a 50%/50% outside/inside air mode for cooling. The system 100 may also operate in an economizer mode. When outside air conditions are moderate enough to meet the requirements of the indoor thermostat, the system 100 may provide an economizer mode. The dampers in the economizer mode will operate in the same manner as the cooling mode, except the burner 102 and the air conditioning compressor 110 will not be turned on. A mixture of outside and inside air will be brought through the system 100 and used to supply air to the indoor environment.

Figure 4:
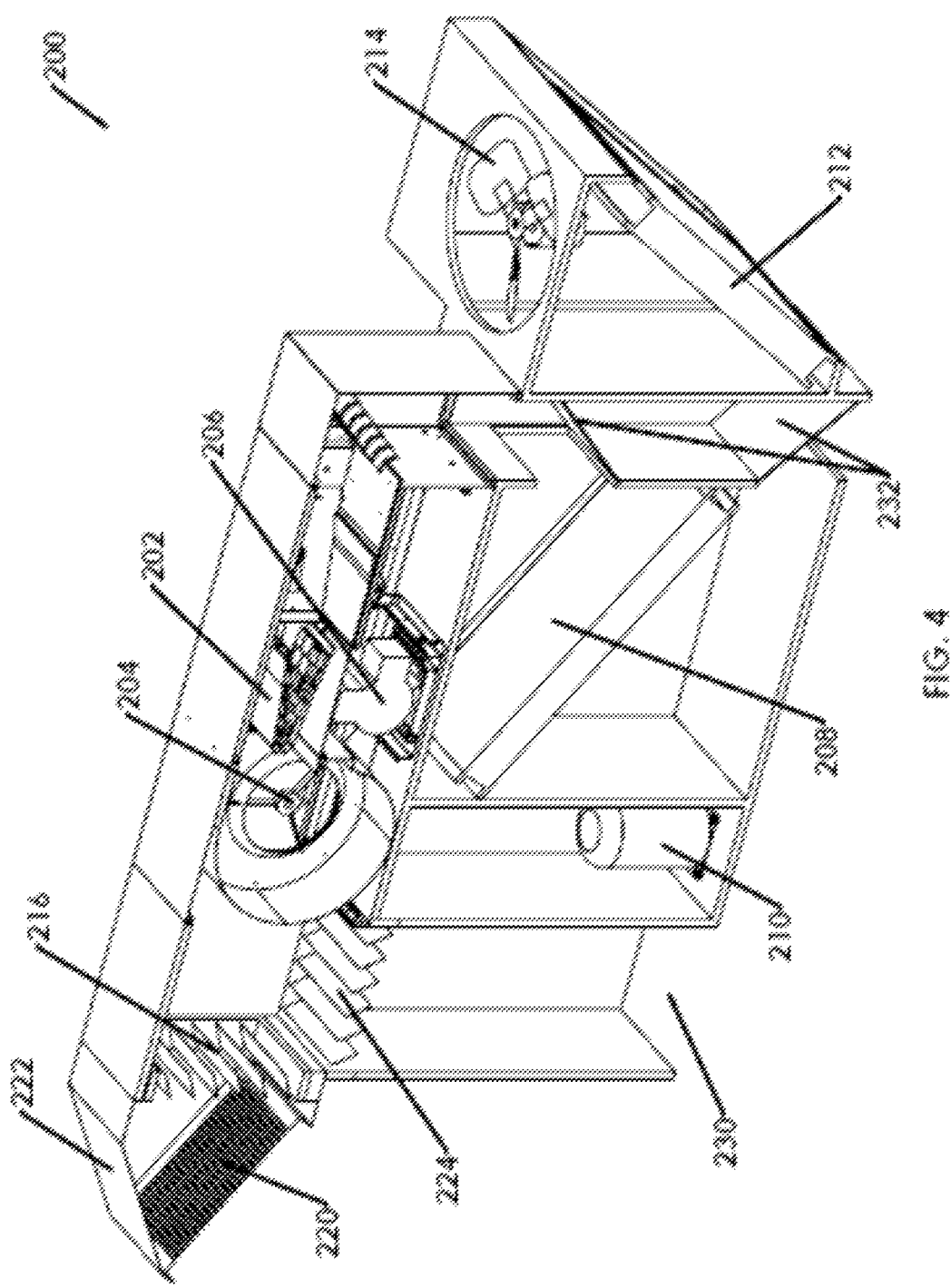
FIG. 4 is a perspective view of a blow through direct fired HVAC system with an evaporator coil downstream of the burner according to exemplary embodiments.
Figure 5:
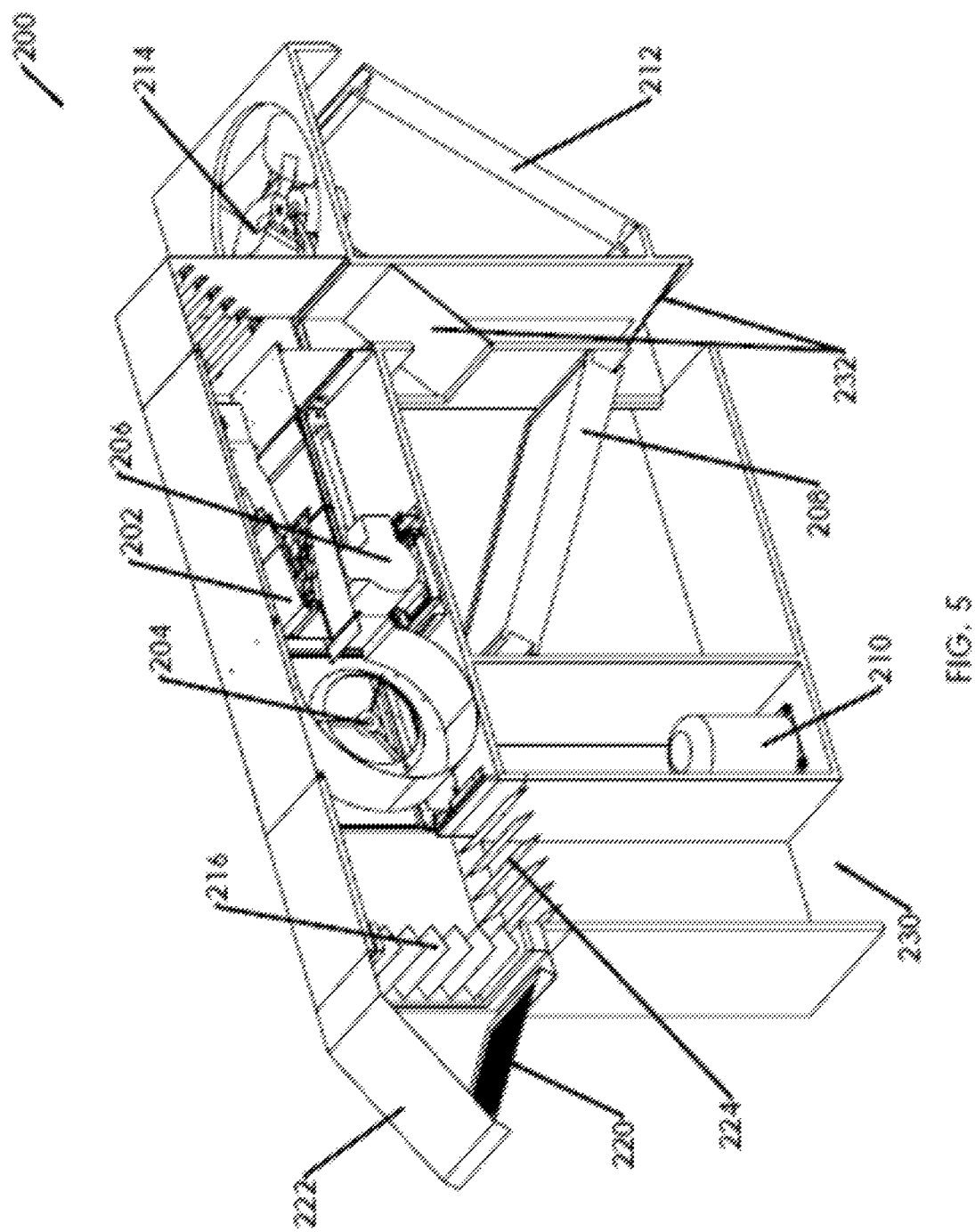
FIG. 5 is another perspective view of the blow through direct fired HVAC system shown in FIG. 4.
Figure 6:
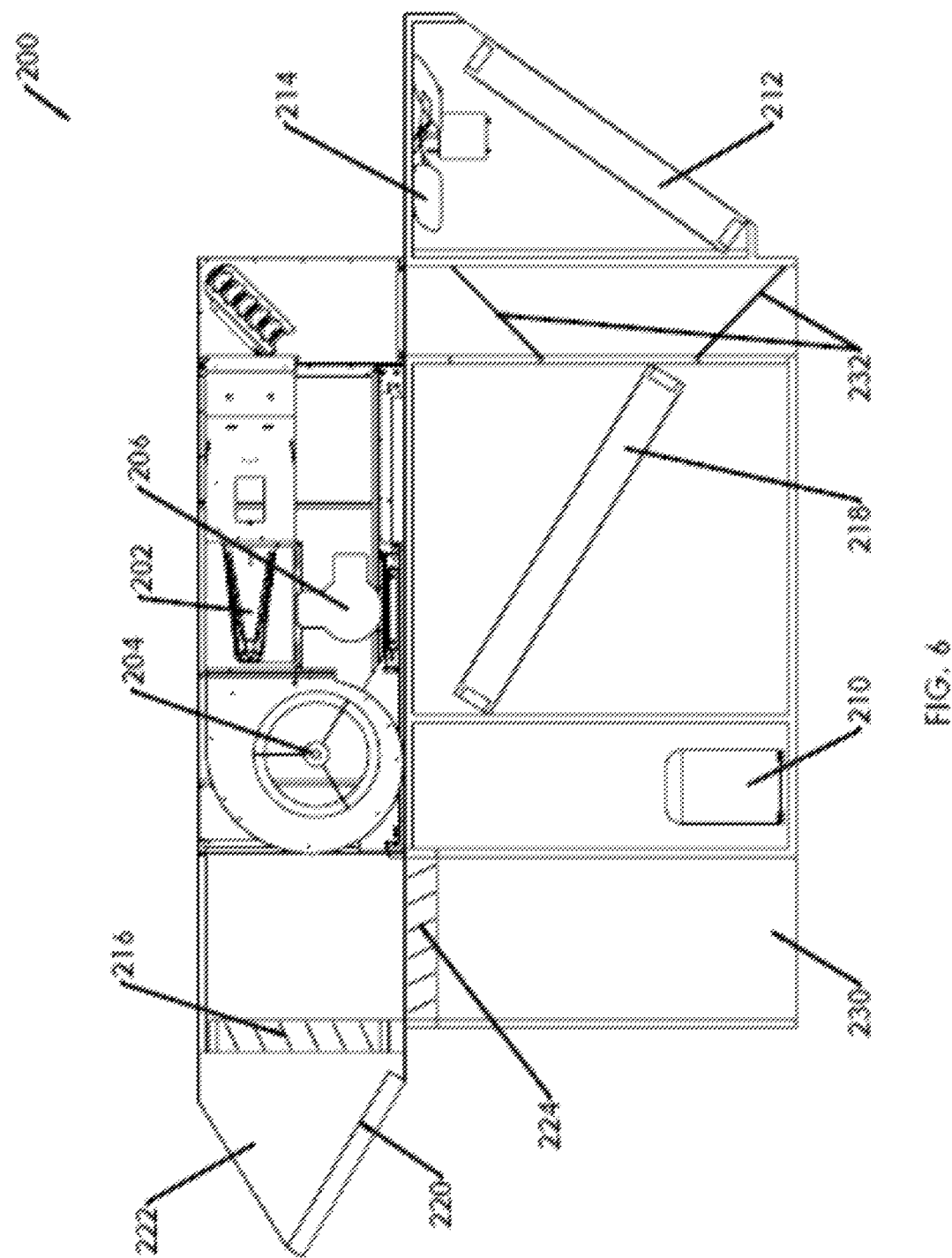
FIG. 6 is a side view of the blow through direct fired HVAC system shown in FIG. 4.

FIGS. 4 through 6 illustrate another example embodiment of a direct fired blow through HVAC system 200 embodying one or more of the various aspects and features disclosed herein. The example embodiment illustrated in FIGS. 4-6 is similar in some aspects to the example embodiment illustrated in FIGS. 1-3, but differs in some aspects as well, including the evaporator coil 208 being positioned downstream of the burner 202.

As shown in FIGS. 4-6, a burner 202 is configured to heat air circulated across an open flame of the burner 202. A blower 204 is disposed upstream of the burner 202 and configured to circulate air across the open flame of the burner 202. Accordingly, the system 200 in this example has a direct fired blow through heater configuration when operating in a heating mode. The blower 204 is driven by motor 206.

The system 200 may also be configured to operate in an air conditioning mode. As such, an evaporator coil 208 is disposed downstream of burner 202. Other components in the system 200 operable during an air conditioning mode include compressor 210, condensing coil 212, condensing coil fan 214, an expansion valve (not shown), and a controller (not shown).

The system 200 also includes components for allowing air to enter and circulate through the system 200. A first inlet includes a first damper 216 configured to allow outside air to enter the system 200 when opened. The outside air passes through inlet screen 220, which is coupled to rain hood 222. A second inlet includes a second damper 224. When the second damper 224 is open, recirculated air from a building may enter the system 200 through building air inlet 230.

The system 200 also includes a discharge mode damper 232, which may be considered an air switching box. The discharge mode damper 232 is moveable between a first diverting position (shown in FIGS. 4-6) in which the discharge mode damper 232 causes air to pass over the evaporator coil 208 before being discharged from the system 200, and a second blocking position (not shown) in which the discharge mode damper 232 prevents or inhibits air from passing over the evaporator coil 208 before being discharged.

There may be micro switches on each damper 216, 224, and 232. A safety circuit and a flame safety relay may ensure that the discharge mode damper 232 is in an evaporator coil blocking position prior to the flame safety relay allowing the burner 202 to begin an ignition cycle. The discharge mode damper 232 and safety circuit ensure that no air (or very little air) will pass over the evaporator coil 208 during heating operation. Although the evaporator coil 208 is downstream of the burner 202 in this example embodiment such that refrigerants will not pass an open flame of the burner, the discharge mode damper 232 ensures that the heated air does not pass over the evaporator coil 208, thereby preventing exposure of high temperatures (e.g., 160 degree Fahrenheit air) across the evaporator coil 208 that would generate excessive pressures in the coil. This could cause unsafe working conditions, or require installation of an extremely robust coil that would not be economical to produce.

When the system 200 is operating in a heating mode, the first damper 216 is open and the second damper 224 is closed. This allows 100% outside air to pass through the blower 204 and burner 202 of the direct fired blow through heating configuration. This prevents or inhibits recirculation of internal air, which is a requirement of ANSI Z83.4 for safe operation of direct fired systems. The system 200 also ensures the discharge mode damper 232 is in an evaporator coil blocking position to prevent exposure of the evaporator coil 208 to high temperatures.

When the system 200 is operating in a cooling mode, both the first damper 216 and the second damper 224 may be opened. The discharge mode damper 232 is moved to a diverting position to cause the air to pass over the evaporator coil 208 before the air is discharged from the system 200. When the first and second dampers 216, 224 are fully opened, they provide a 50%/50% split of outside air and recirculated inside air to flow through the evaporator coil 208. This provides outside fresh air to a building to meet ventilation requirements and recirculated indoor air to be more economical, because cooling 100% outside air requires significantly more energy.

Figure 7:
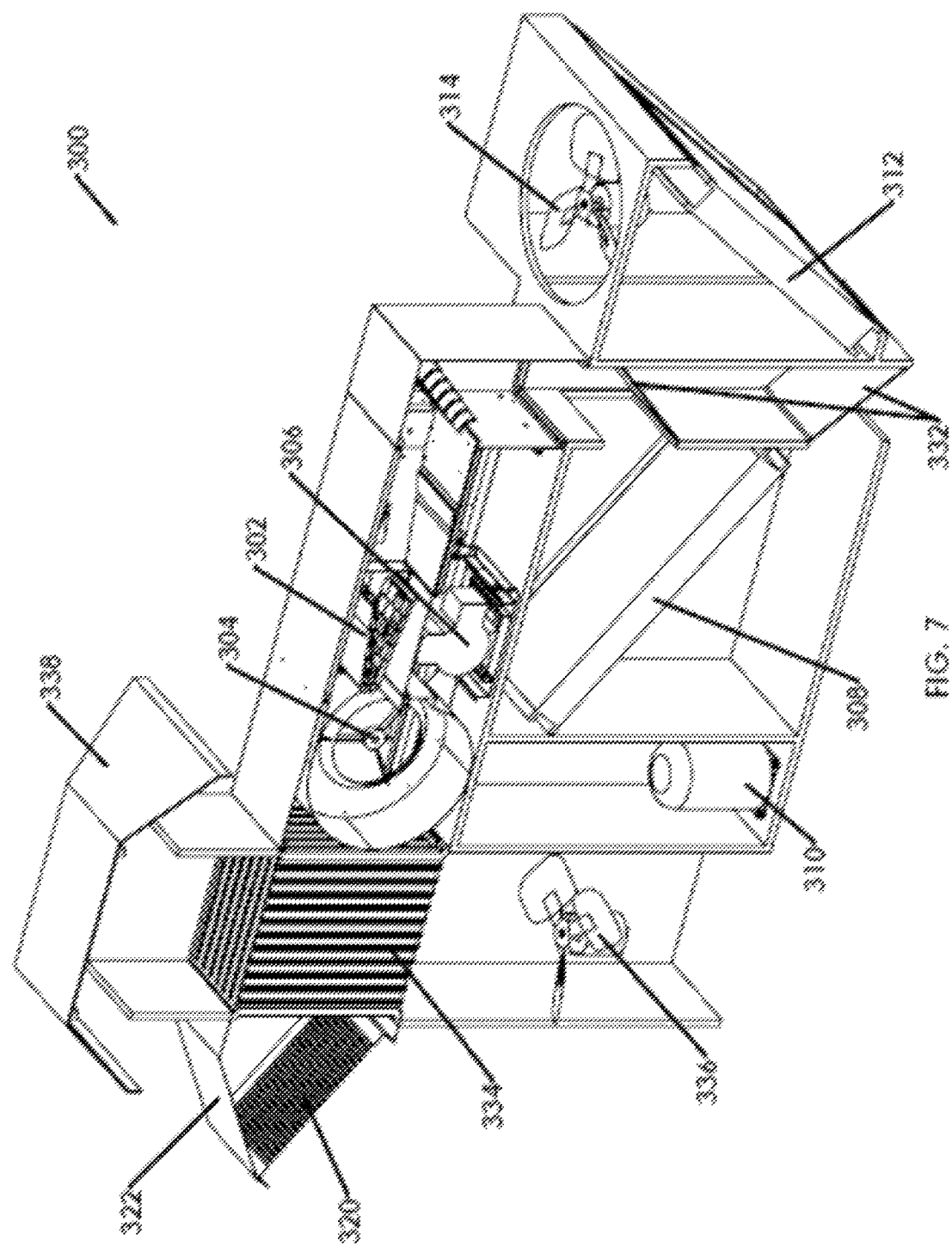
FIG. 7 is a perspective view of a blow through direct fired HVAC system with energy recovery ventilation according to exemplary embodiments.

FIGS. 7 through 9 illustrate another example embodiment of a direct fired blow through HVAC system 300 embodying one or more of the various aspects and features disclosed herein. The example embodiment illustrated in FIGS. 7-9 is similar in some aspects to the example embodiment illustrated in FIGS. 4-6, but differs in some aspects as well, including the energy recovery ventilation module.

As shown in FIGS. 7-9, a burner 302 is configured to heat air circulated across an open flame of the burner 302. A blower 304 is disposed upstream of the burner 302 and configured to circulate air across the open flame of the burner 302. Accordingly, the system 300 in this example has a direct fired blow through heater configuration when operating in a heating mode. The blower 304 is driven by motor 306.

The system 300 may also be configured to operate in an air conditioning mode. As such, an evaporator coil 308 is disposed downstream of burner 302. Other components in the system 300 operable during an air conditioning mode include compressor 310, condensing coil 312, condensing coil fan 314, an expansion valve (not shown), and a controller (not shown).

The system 300 also includes components for allowing air to enter and circulate through the system 300, as well as exit a building and be exhausted to the outside air. An inlet includes outside air passing through inlet screen 320, which is coupled to rain hood 322. Separately, an exhaust fan 336 blows exhaust air from inside a building, out of the system 300 through exhaust rain hood 338.

The system 300 also includes a discharge mode damper 332, which may be considered an air switching box. The discharge mode damper 332 may include at least two diverter dampers. The discharge mode damper 332 is moveable between a first diverting position (shown in FIGS. 7-9) in which the discharge mode damper 332 causes air to pass over the evaporator coil 308 before being discharged from the system 300, and a second blocking position (not shown) in which the discharge mode damper 232 prevents or inhibits air from passing over the evaporator coil 308 before being discharged.

A safety circuit and a flame safety relay may ensure that the discharge mode damper 332 is in an evaporator coil blocking position prior to the flame safety relay allowing the burner 302 to begin an ignition cycle. The discharge mode damper 332 and safety circuit ensure that no air (or very little air) will pass over the evaporator coil 308 during heating operation. Although the evaporator coil 308 is downstream of the burner 302 in this example embodiment such that refrigerants will not pass an open flame of the burner, the discharge mode damper 332 ensures the heated air does not pass over the evaporator coil 308, thereby preventing exposure of high temperatures (e.g., 160 degree Fahrenheit air) across the evaporator coil 308 that would generate excessive pressures in the coil. This could cause unsafe working conditions or require installation of an extremely robust coil that would not be economical to produce.

The system 300 also includes an energy recovery ventilation (ERV) device 334. The ERV device 334 allows outside air to flow into the system 300 in a first set of one or more channels, while also allowing inside air to be exhausted from inside the building through a second set of one or more channels. The first and second sets of channels may be disposed adjacent to one another in perpendicular directions. In heating, cooling, and economizer modes, air may be exhausted through the ERV device 334 and released outdoors. As air passes through the ERV device 334, sensible and latent energy transfer may occur between the incoming and exiting air streams. For example, the channels for the inlet air and the exhaust air may be disposed in sufficient proximity (e.g., in thermal contact) such that energy may transfer between the inlet air and the exhaust air. Although a block style ERV device 334 is illustrated in FIGS. 7-9, other suitable ERV devices may be used in other embodiments, such as, for example, ERV wheels capable of providing sensible and latent heat transfer.

In colder outdoor conditions (e.g., winter), warm moist air is exhausted and a portion of the energy (e.g., sensible and latent) is transferred to the incoming air. This preheated air then enters the blower 304 and burner 302. Depending on the temperature of the preheated incoming air, the burner 302 may turn on and modulate to meet the requirements of a thermostat. The discharge mode damper 332 allows a straight path for air flow down into the building in heating or economizer modes. The air switching box includes micro switches and a safety circuit that will ensure the hot air from the burner 302 will not pass over the evaporator coil 308. The excessive temperatures of the hot air will be safely diverted around the evaporator coil 308, preventing generation of excessive temperatures in the refrigerant of the evaporator coil 308, which could damage the system 300 and lead to refrigerant leaks and possible harmful products of combustion.

In hotter outdoor conditions (e.g., summer), cold air is exhausted from the building through the ERV device 334. The incoming air will cool as it passes the ERV device 334. This precooled air will enter the blower 304 and be delivered to the lower section of the system 300. Here the switching box will divert the air over the evaporator coil 308. The air will be further cooled by the evaporator coil 308 and will be delivered into the building to meet the thermostat requirements. The air switching box, micro switches, and a safety circuit will ensure that when the thermostat is in a cooling mode, the airflow is directed properly across the evaporator coil 308, and the burner 302 is turned off.

When outside conditions are acceptable to meet the internal thermostat requirements, the system 300 will go into an economizer mode with the A/C compressor 310 turned off and air diverted around the evaporator coil 308 directly into the building.

At least some of the example embodiments described herein may include a variable frequency drive (VFD) to control the rpm (revolutions per minute) of the fan motor upstream of the burner. This provides a capability to vary the amount of air delivered through the system and to adjust the varying static of two different air flows.

In a heating mode, the airstream may require less total airflow due to the high temperature rise of a blow through direct fired system, and the flow path of the air may have less restriction or less static pressure. In a cooling mode, the amount of airflow must be increased above the heating mode level, and the air path is greatly restricted due to the additional static pressure of the evaporator coil in the air stream combined with higher velocities of air. The addition of a VFD allows for a combination of blow through direct heating, direct expansion (DX) cooling, and energy recovery ventilation (ERV) in one packaged unit with one supply air fan.

At least some of the example embodiments described herein may include variable dampers, which allow the system to operate at other conditions in cooling mode besides a 50%/50% outside/inside air mixture. Depending on the enthalpy of the indoor and outdoor air (e.g., wet bulb and dry bulb temperatures) and the indoor need for outside air, one or more dampers can vary to change the mixture from 50% outside air to 0% outside air. In situations where no additional outside air is needed to meet the inside fresh air requirements, the system can run cooling using 100% recirculated inside air, which may be more economical.

The system may include a sensor for sensing one or more operating parameters of the system, including but not limited to, indoor temperature, outside temperature, dry bulb temperature, wet bulb temperature, indoor air quality requirements ascertained by carbon dioxide ($CO_2$) detection, etc. The sensed parameters may be monitored by a controller configured to operate the system at different air flow rates and/or different combination mixtures of indoor and outdoor air, to improve system performance (e.g., efficiency, air quality, etc.) based on the sensed parameters. For example, the controller may adjust a VFD of the blower motor to increase air speed based on detected indoor and outdoor temperatures, the controller may adjust variable dampers to change the indoor/outdoor air mixture based on $CO_2$ detection, etc.

Exemplary embodiments of a direct fired heater disclosed herein may be configured such that they are associated with, include, allow, or provide one or more (but not necessarily any or all) benefits including, providing blow through direct fired heating, direct expansion cooling, and/or energy recovery ventilation in a single packaged unit, preventing harmful combustion of refrigerant gasses, preventing harmful pressures from developing in an evaporator coil, varying the amount of air delivered through the system in different operating modes, varying the mixture of inside and outside air to increase efficiency, increased efficiency and/or economical savings for an HVAC system, etc.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (i.e., the disclosure of a first value and a second value for a given parameter can be interpreted as disclosing that any value between the first and second values could also be employed for the given parameter). For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10, or 2-9, or 3-8, it is also envisioned that Parameter X may have other ranges of values including 1-9, 1-8, 1-3, 1-2, 2-10, 2-8, 2-3, 3-10, and 3-9.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally," "about," and "substantially," may be used herein to mean within manufacturing tolerances. Whether or not modified by the term "about," the claims include equivalents to the quantities.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements, intended or stated uses, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A direct fired, blow through HVAC system comprising:
   a burner configured to heat air circulated across an open flame of the burner;
   a supply air blower disposed upstream of the burner;
   an evaporator coil configured to cool air through direct expansion, the evaporator coil disposed upstream of the burner;
   an air switching box configured to selectively direct air through or around the evaporator coil; and
   a safety circuit configured to selectively turn off the burner;
   wherein:
      the safety circuit is configured to, while the system is operating in a cooling and/or air-conditioning mode, ensure the burner is off prior to any air being circulated across the evaporator coil; and
      the air switching box is configured to, while the system is operating in a heating mode and the burner is on, direct a supply of air around the evaporator coil to the burner so the supply of air does not pass through the evaporator coil prior to entering the burner to ensure any potential leak of refrigerant will not pass through an open flame of the burner.

2. The system of claim 1, further comprising one or more inlets configured to provide air for circulation through the system.

3. The system of claim 2, wherein the one or more inlets are configured to provide:
   recirculated indoor air combined with outdoor air while the system is in a cooling mode; and
   outdoor air only while the system is in a heating mode.

4. The system of claim 2, further comprising an energy recovery ventilation device configured to recover energy from conditioned air leaving an enclosed space and reintroduce the recovered energy into the air received at the one or more inlets for circulation through the system.

5. The system of claim 2, further comprising at least one sensor configured to detect an operating parameter of the system.

6. The system of claim 5, wherein the operating parameter includes at least one of carbon dioxide, humidity, indoor temperature, outdoor temperature, and dry bulb temperature.

7. The system of claim 6, further comprising a controller coupled to one or more components of the system and configured to control at least one operating characteristic of the system, based on the detected operating parameter.

8. The system of claim 7, wherein the at least one operating characteristic includes one or more of an operating airflow, a gas modulation, and a percentage of indoor and outdoor air combination.

9. The system of claim 8, wherein the one or more inlets comprise one or more variable dampers, the variable dampers configured to adjust a mixture of outdoor and indoor air supplied to the system.

10. The system of claim 8, wherein the supply air blower includes a variable frequency drive configured to adjust an amount of airflow through the system based on an operating mode of the system.

11. The system of claim 1, further comprising:
a compressor configured to pressurize a refrigerant;
a condensing coil coupled to the compressor and configured to receive the refrigerant and convert the refrigerant from a gas to a liquid;
one or more condensing coil fans configured to circulate air across the condensing coil;
an expansion valve coupled to the condensing coil and configured to remove pressure from the refrigerant before providing the refrigerant to the evaporator coil; and
a controller coupled to one or more of the evaporator coil, compressor, condensing coil, one or more condensing fans, and the expansion valve, the controller configured to operate the HVAC in a cooling mode.

12. The system of claim 11, further comprising one or more inlets configured to provide air for circulation through the system.

13. The system of claim 12, further comprising an energy recovery ventilation device configured to recover energy from conditioned air leaving an enclosed space and reintroduce the recovered energy into the air received at the one or more inlets for circulation through the system.

14. The system of claim 3, further comprising:
a compressor configured to pressurize a refrigerant;
a condensing coil coupled to the compressor and configured to receive the refrigerant and convert the refrigerant from a gas to a liquid;
one or more condensing coil fans configured to circulate air across the condensing coil;
an expansion valve coupled to the condensing coil and configured to remove pressure from the refrigerant before providing the refrigerant to the evaporator coil; and
a controller coupled to one or more of the evaporator coil, compressor, condensing coil, one or more condensing fans, and the expansion valve, the controller configured to operate the HVAC in a cooling mode.

15. The system of claim 1, further comprising at least one sensor configured to detect an operating parameter of the system, wherein the operating parameter includes at least one of carbon dioxide, humidity, indoor temperature, outdoor temperature, and dry bulb temperature.

16. The system of claim 15, further comprising a controller coupled to one or more components of the system and configured to control at least one operating characteristic of the system based on the detected operating parameter, wherein the operating characteristic includes one or more of an operating air flow, a gas modulation, and a percentage of indoor and outdoor air combination.

17. The system of claim 8, further comprising:
a compressor configured to pressurize a refrigerant;
a condensing coil coupled to the compressor and configured to receive the pressurized refrigerant and convert the refrigerant from a gas to a liquid;
one or more condensing coil fans configured to circulate air across the condensing coil;
an expansion valve coupled to the condensing coil and configured to remove pressure from the refrigerant;
an evaporator coil configured to receive the refrigerant from the expansion valve and cool air circulated through the system through direct expansion; and
a controller coupled to one or more of the evaporator coil, compressor, condensing coil, one or more condensing fans, and the expansion valve, the controller configured to operate the system in a cooling mode.

\* \* \* \* \*